Patented May 21, 1929.

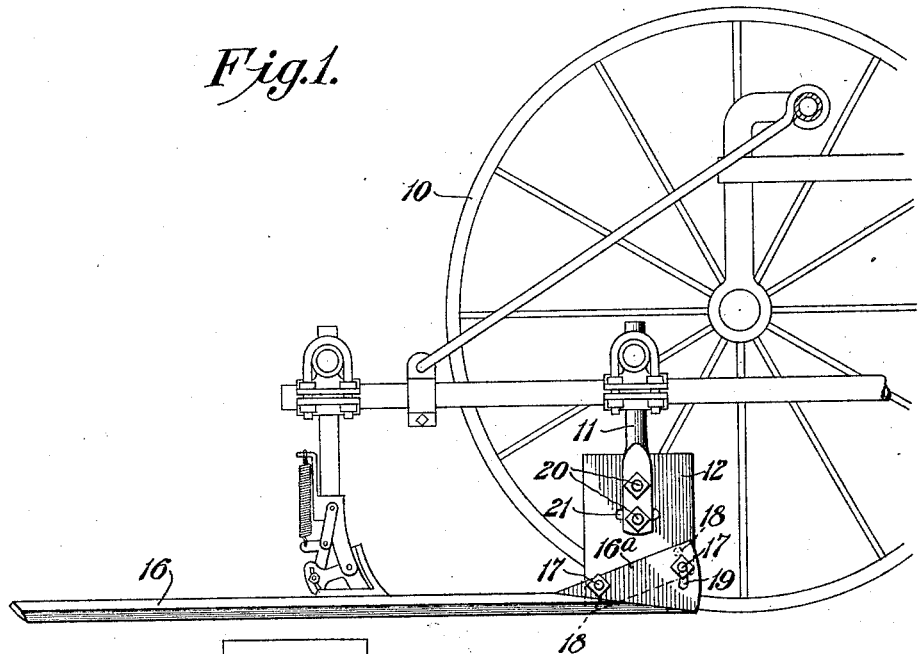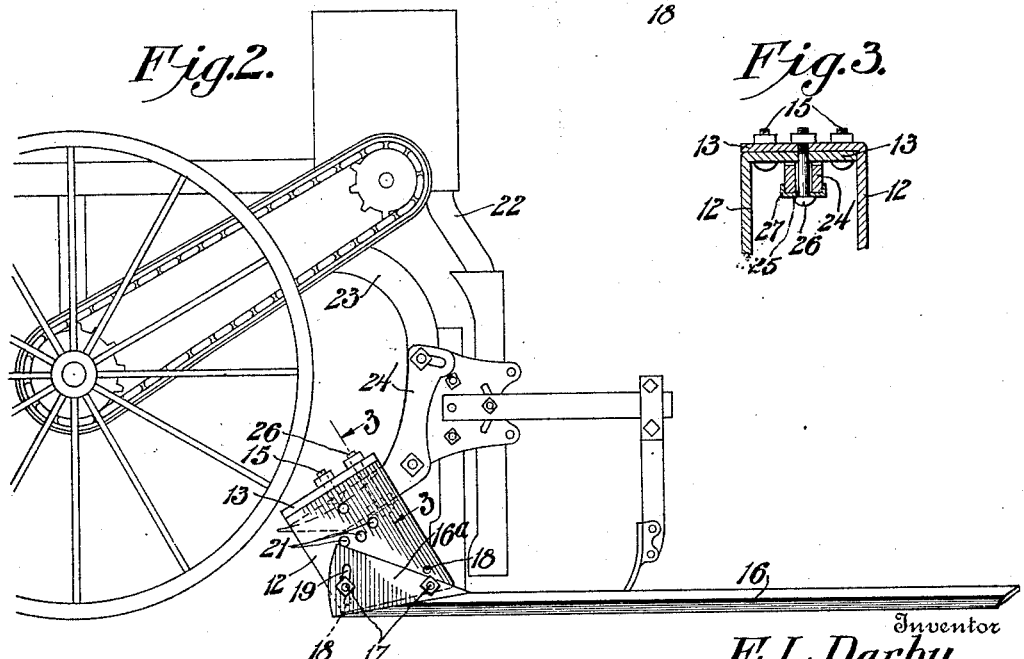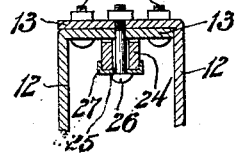

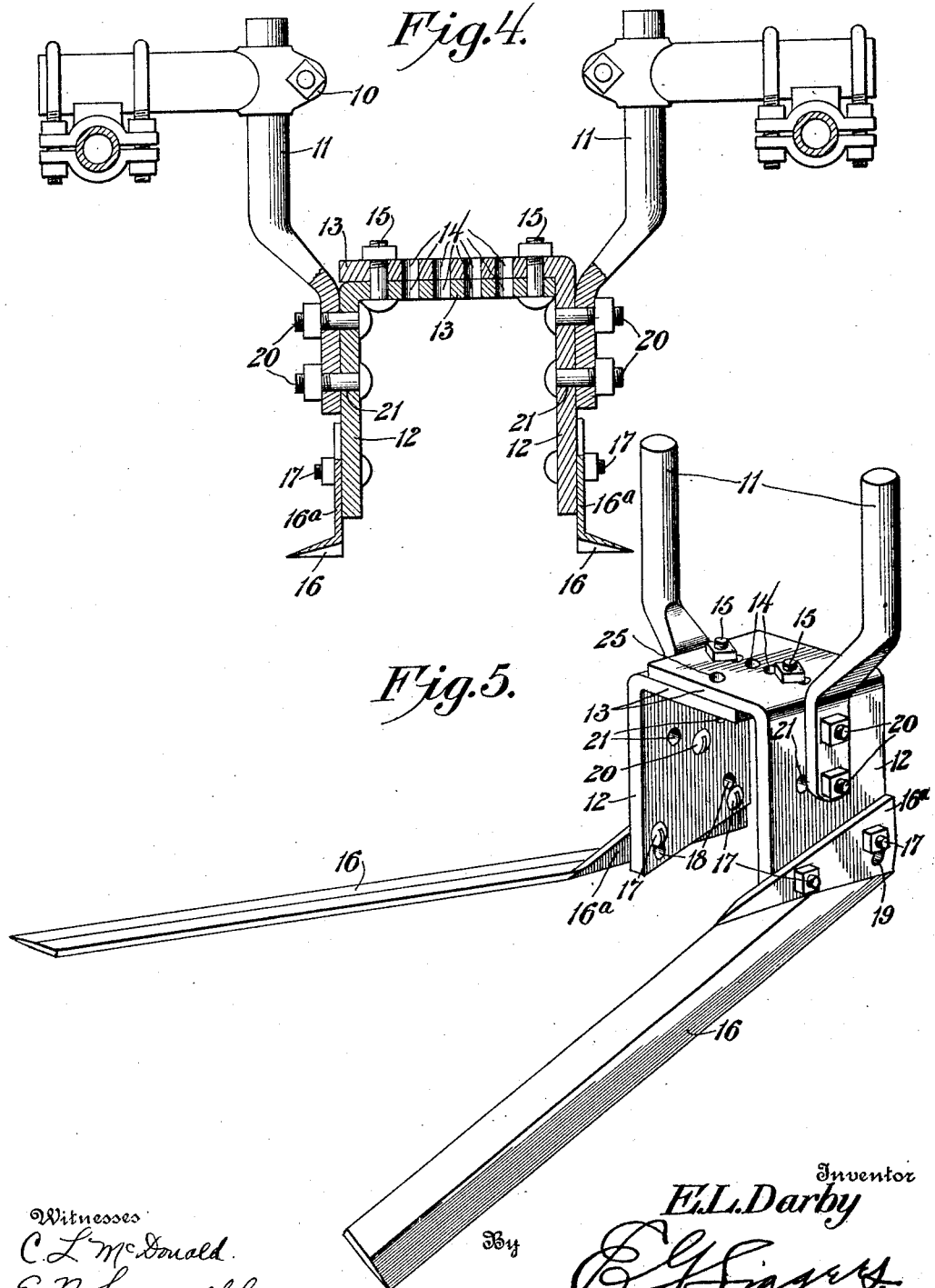

1,713,744

UNITED STATES PATENT OFFICE.

EDWARD LEE DARBY, OF SNYDER, TEXAS, ASSIGNOR OF ONE-TWENTIETH TO
C. FRANK SENTELL, OF SNYDER, TEXAS.

EARTH-WORKING ATTACHMENT FOR FARM IMPLEMENTS.

Application filed January 8, 1927. Serial No. 159,843.

This invention relates to an earth working attachment for farm implements, and is adapted particularly for destroying weeds in and between the rows, and for loosening the dirt and throwing some of it up around the growing plants.

The object of the invention is to provide an attachment for this purpose which may be easily attached to the modern type of lister planter, or to a middle breaker, or, in fact, to any of the cultivators or planters now commonly used, and which has various adjustments which adapt it to the size and condition of the plants, and to the particular kind of plants being cultivated. Provision is made for adjusting the blades bodily toward and from each other, or for adjusting them vertically. They may be held in a horizontal position, or may be tilted either forwardly or backwardly.

The specific construction of the invention, its mode of operation and the advantages thereof will be more fully explained in connection with the accompanying drawings, which illustrate the same in its preferred form.

In the drawings:

Figure 1 is a side elevation of the invention attached to a cultivator.

Figure 2 is a side elevation of the invention attached to a planter.

Figure 3 is a detail sectional view taken on the line 3—3 of Figure 2.

Figure 4 is a transverse section of the invention as attached to the cultivator.

Figure 5 is a perspective view of the invention detached from the cultivator.

In attaching the invention to the cultivator 10, as shown in Figure 1, the front cultivator teeth are removed, and in their place are secured shanks 11, which carry the attachment constituting the subject matter of the invention. Secured to the lower ends of the shanks 11 are brackets 12, which are formed with flanges 13 adapted to overlap, as shown in Figures 4 and 5. Each of the flanges 13 is provided with a series of holes 14, adapted to receive bolts 15 for securing the two brackets to each other. It will be observed that the holes 14 are equally spaced, and that there are a sufficient number of them to permit considerable latitude in adjusting the brackets toward and from each other.

Each of the brackets 12 has a blade 16 secured to its lower end. In order to secure the blade to the bracket, it is preferably formed at its forward end with an upturned flange 16ª, which is connected to the bracket by means of bolts 17, or the like. The bracket is provided with two or more pairs of holes 18 for receiving the bolts, so as to allow for a certain amount of vertical adjustment of the blade. The flange 16ª is also provided with a slot 19 for receiving one of the bolts, so as to allow a limited tilting adjustment of the blade with respect to the bracket.

Each bracket 12 is secured to the corresponding shank 11 by suitable bolts 20, and a number of holes 21 are provided for one of these bolts, so as to permit the brackets to be secured in such relation to the shanks as to hold the blades 16 in substantially horizontal position, or to tilt them either forwardly or rearwardly at an angle, which may approximate forty-five degrees. In order that the brackets may be tilted forwardly without projecting the lower edges thereof below the front ends of the blades, the same are inclined forwardly as clearly shown in the drawings.

In Figures 2 and 3, I have shown my device as attached to the planter 22, having a plow beam 23 with a middle breaker foot 24. In attaching the device to the foot 24, the shanks 11 are not used, but an additional hole 25 is provided in the flanges 13 to receive a bolt 26 which passes through the foot 24, and, in connection with plate or washer 27, secures the attachment thereto.

From the foregoing description, it will be seen that my device is easily attachable to any of the common types of cultivators and planters, including what are known as lister planters and middle breakers. The blades have a considerable range of lateral adjustment, and may also be raised and lowered to adapt the device to the size or character of the plants being cultivated. When the brackets 12 are set to the rear, the device will knife the land, and when set forward, it will plow and knife the land at the same time. When the brackets are in intermediate position, it will act as a weed cutter or drag. In using the attachment with a cultivator, the rear cultivator teeth also will generally be used to plow up the soil in rear of the knives to prevent it from baking, or forming hard pan.

While I have shown and described the invention in considerable detail, it will be readily understood that many modifications may be made in the various parts of the device without any material departure from the salient features thereof as defined in the claim.

What is claimed is:

A cultivating attachment for farm implements comprising, in combination, a pair of supporting shanks, an inverted U-shaped, laterally adjustable bracket bolted to the shanks and having a plurality of bolt openings arranged to permit angular adjustments of the U-shaped bracket with respect to the shanks; the lower edges of the bracket being forwardly and upwardly inclined; wing blades having side cutting edges and presenting flanges bolted to the outer walls of the brackets; said flanges having arcuate slots to permit vertical angular adjustments of the blades with respect to the bracket; said bracket having vertically spaced holes to permit vertical adjustment of the blades; and the forward portions of the cutting edges of the blades extending below and being free from the lower inclined edges of the brackets.

In testimony, that I claim the foregoing as my own, I have hereto affixed my signature.

EDWARD LEE DARBY.